United States Patent [19]

Hounsfield et al.

[11] Patent Number: 4,702,667
[45] Date of Patent: Oct. 27, 1987

[54] COMPLIANT COUPLING MECHANISM

[75] Inventors: Godfrey N. Hounsfield, Twickenham; Anthony M. Williams, Iver, both of England

[73] Assignee: EMI Limited, Hayes, England

[21] Appl. No.: 817,579

[22] Filed: Jan. 10, 1986

[30] Foreign Application Priority Data

Jan. 23, 1985 [GB] United Kingdom ................. 8501654

[51] Int. Cl.[4] ............................................ B25J 17/02
[52] U.S. Cl. ..................................... 414/735; 403/32; 403/325; 901/45; 901/49
[58] Field of Search ........................ 414/729, 730, 735; 901/45, 49, 41; 294/119.4; 403/325, 32; 269/24, 71

[56] References Cited

U.S. PATENT DOCUMENTS 4,073,201  2/1978  Taylor et al. ..................... 901/29 X
4,540,331  9/1985  Stanner et al. ................... 901/49 X

FOREIGN PATENT DOCUMENTS 1437003  5/1976  United Kingdom .

Primary Examiner—Robert J. Spar
Assistant Examiner—Donald W. Underwood
Attorney, Agent, or Firm—Fleit, Jacobson, Cohn & Price

[57] ABSTRACT

A compliant coupling mechaism has a first part (10) connectable to a robot arm (A) and a second part (20) connectable to a robot gripper (G). The mechanism is arranged to allow displacement of the second part relative to first part along a ZZ axis direction, and to allow further relative displacement along and/or about (XX) and (YY) axis directions. A locking device (40) prevents such further relative displacement unless a displacement along the (ZZ) axis direction exceeds a preset amount.

5 Claims, 5 Drawing Figures

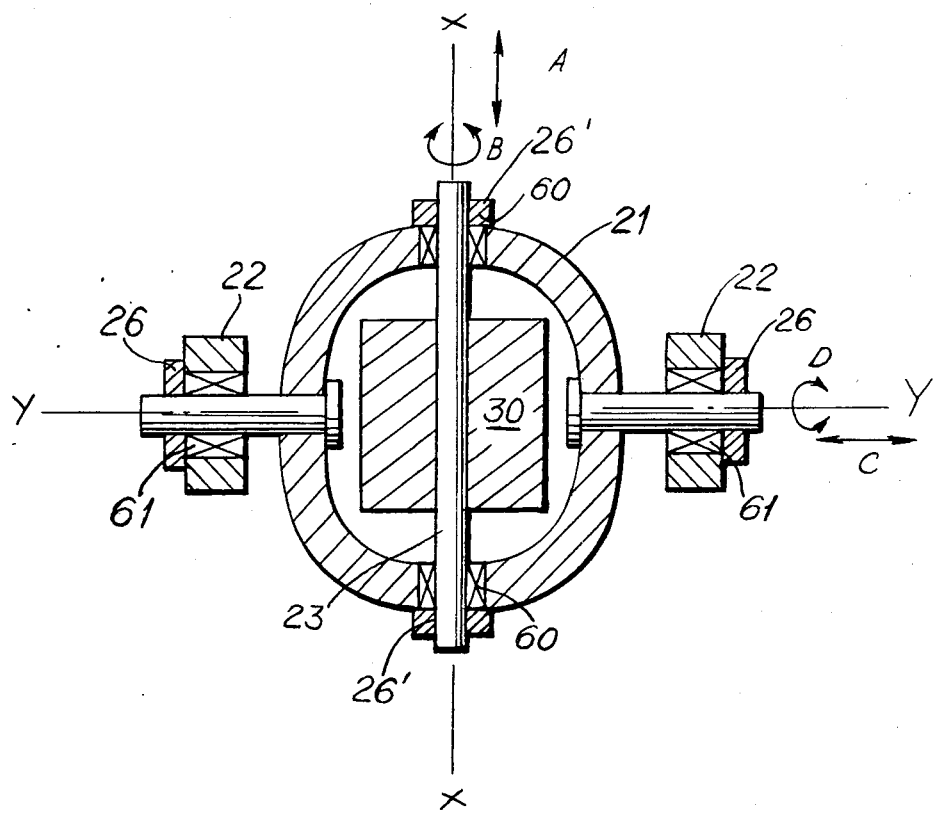

COMPLIANT COUPLING MECHANISM

This invention relates to a compliant mechanism for coupling a robot gripper to a robot arm.

Figure 1:
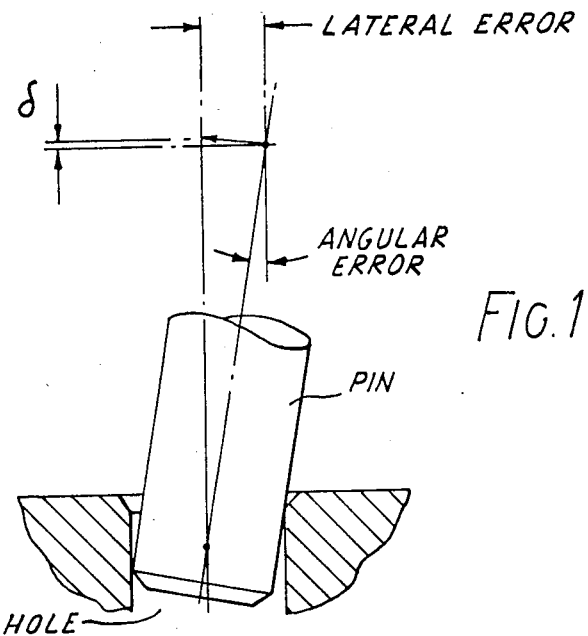
Figure 2:
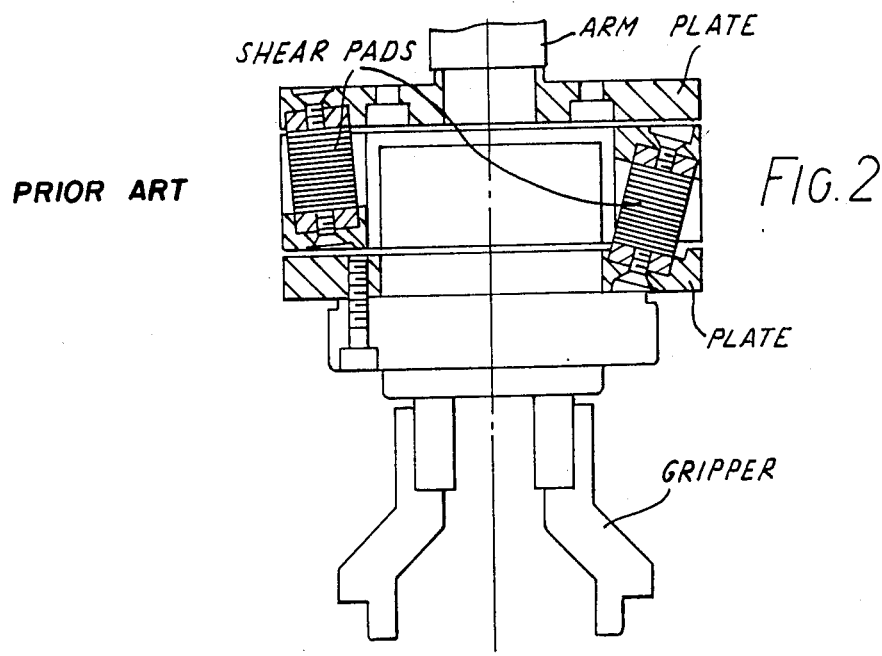

In some automated assembly and/or processing operations the positional accuracy of the gripper, in relation to the workpiece, can be of critical importance. FIG. 1 of the accompanying drawings illustrates how both lateral and angular misalignment of a pin in relation to a hole may hinder insertion, and may even cause jamming. One solution to this problem involves providing a compliant coupling mechanism between the arm and the gripper; the gripper could then respond to the forces acting on it and so compensate for misalignment. One known mechanism, shown in FIG. 2, comprises two metal plates, one connected to the robot arm and the other to the gripper. The plates are joined together by a pair of elastomeric shear pads each consisting of a stack of metal and rubber washers, arranged alternately. The shear pads are set at a slight angle so as to allow, in effect, rotational and/or lateral displacement of the gripper in relation to the arm. In some operational situations this mechanism has proved inadequate. In particular, it will be apparent from FIG. 1 that in the case of a pin entering a hole a small displacement δ, in the normal insertion direction, will be required in addition to rotational and/or lateral displacement; however, a device of the kind described in relation to FIG. 2 cannot accommodate a displacement δ. Moreover the device tends to be sensitive to vibration.

It is therefore an object of the present invention to provide a different form of compliant coupling mechanism whereby the above-described problems are at least alleviated.

Accordingly there is provided a complaint mechanism for coupling a robot gripper to a robot arm comprising first compliant means arranged to allow displacement of a support for the gripper, relative to the arm, along a first axis and second compliant means, arranged to allow further displacement of said support, relative to the arm, along and/or about at least one other axis and wherein locking means is arranged to prevent said further displacement unless relative displacement along said first axis exceeds a preset amount.

In a specific application, a compliant coupling mechanism in accordance with the present invention may be utilised to facilitate insertion of a pin in a hole, the first compliant means accommodating a displacement in the normal insertion direction as illustrated in FIG. 1.

In order that the invention may be carried readily into effect an embodiment thereof is now described, by way of example only, by reference to FIGS. 3a and 3b which show orthogonal, sectional views taken through a compliant coupling mechanism on axes YY and XX respectively, FIG. 3b being shown partly in side elevation view, and FIG. 3c which shows a schematic horizontal sectional view through I—I in FIG. 3b.

Referring to FIGS. 3a and 3b, the coupling mechanism, shown generally at C, connects a robot arm, represented at A, to a robot gripper, represented at G. Both the arm and the gripper may be of conventional form.

The coupling mechanism embodies a compliant arrangement which is so configured as to allow displacement of a support for the gripper, with respect to the arm, along an axis ZZ. Such displacement may be produced in response to a force exerted on the gripper during a typical assembly and/or processing operation e.g. insertion of a pin in a closely fitting hole. As will be described in greater detail hereinafter, the coupling mechanism is arranged also to provide additional compliance, allowing displacement of the gripper support along and/or about two other axes XX and YY which, in this example, are arranged orthogonally in relation to one another, and to axis ZZ. A locking device is provided to release this additional compliance, when required, should displacement along axis ZZ exceed a preset amount.

It will be appreciated that if undue resistance is experienced by the gripper while a pin is being inserted in a hole, the compliant arrangement allows the gripper to respond to the forces acting on it causing the pin to approach an equilibrium position and enter the hole smoothly. In this connection, the coupling mechanism, being compliant in relation to the ZZ axis direction in addition to the XX and YY axis directions, can compensate for an alignment error ( ), of the kind shown in FIG. 1, in addition to lateral and/or rotational alignment errors.

Figure 3:
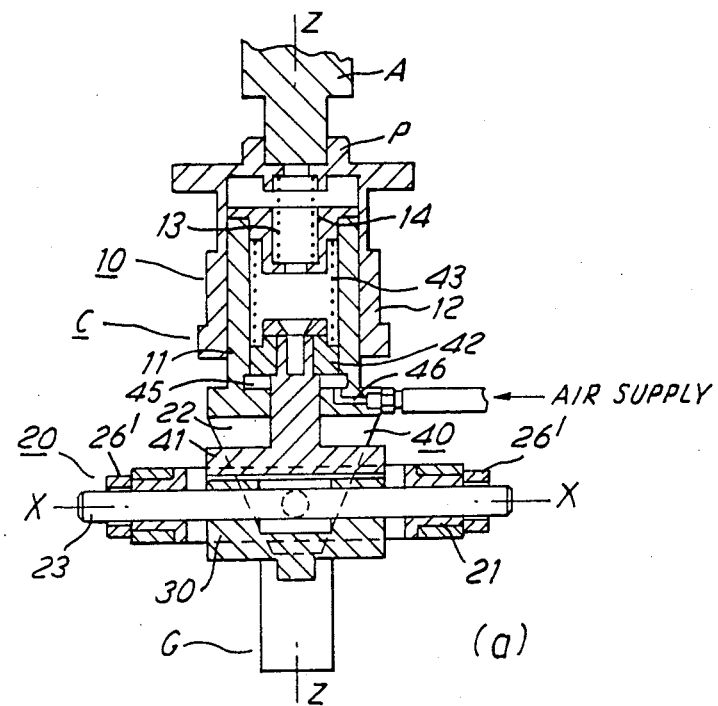
Figure 3:
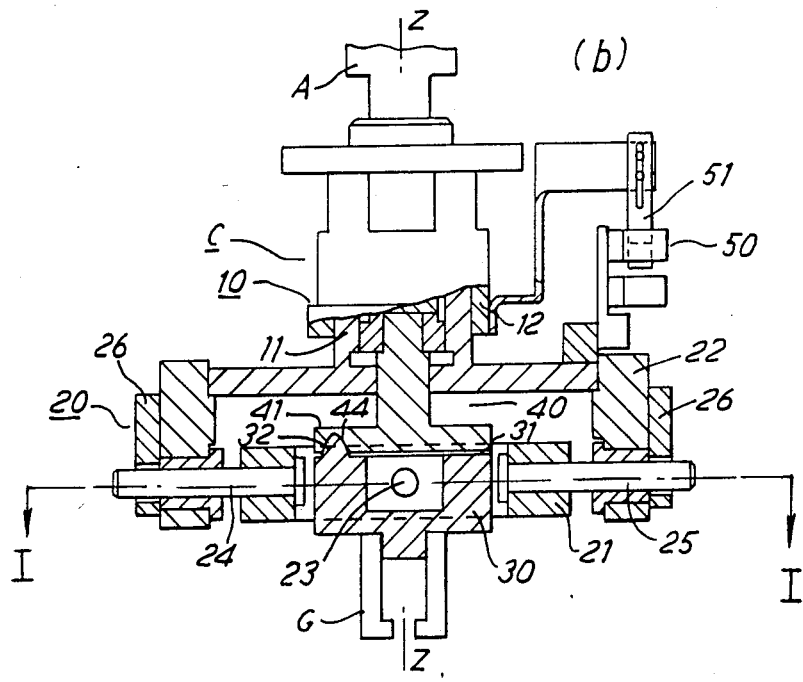

The coupling mechanism, shown in FIG. 3, includes a piston arrangement 10 connected to the arm and a gimbal arrangement 20 coupled, via a support block 30, to the gripper. This piston arrangement allows displacement of the support block, with respect to the arm, along axis ZZ whereas the gimbal arrangement allows additional displacement of the support block along and/or about axes XX and YY, provided a displacement along axis ZZ exceeds a preset amount, typically 0.5 mm. In normal operation of the mechanism, that is when the gripper experiences little or no resistance to movement, a locking device 40 maintains the gimbal arrangement in a locked condition (as shown in the drawings) such that displacement along and/or about the axis XX and YY cannot take place. If, however, displacement along axis ZZ exceeds the preset amount the locking device frees to gimbal arrangement providing additional compliance in relation to the XX and YY axis directions.

The piston arrangement 10 comprises a cylindrical plunger 11 which can move on axis ZZ within a closely fitting cylindrical sleeve 12 connected at P to the arm. The plunger and sleeve are coupled together resiliently by a compression spring 13 which is connected, as shown, to a flange 14 mounted at the open end of the plunger. If the gripper experiences a force directed along axis ZZ the plunger will be displaced with respect to the sleeve causing the spring 13 to be compressed.

The gimbal arrangement 20, in FIGS. 3a and 3b and shown schematically in FIG. 3c, comprises an inner frame member 21 supported by an outer frame member 22, which is formed integrally with plunger 11. Support block 30 is mounted fixedly on a shaft 23 which is supported in bearings 60 by the inner frame member 21. In the unlocked condition, the shaft 23 is free to slide and/or turn in the bearings 60 so that the support block 30 may be displaced along and/or rotate about the longitudinal axis XX of the shaft 23, as shown by arrows A and B. Similarly, the inner frame member 21 is mounted fixedly on a pair of shafts 24, 25 supported freely, in bearings 61, by the outer frame member 22. Again, in the unlocked condition, the inner frame member 21 and so the support block 30 may be displaced along, and/or rotate about, the common longitudinal axis YY of shafts 24, 25, as shown by arrows C and D. The inner and outer frame members 21, 22 are provided with respective collars 26, 26' which provide a sufficient degree of frictional resistance to reduce any tendency for the shafts 23, 24, 25 to move irregularly in their respective bearings 60, 61. The locking device 40 includes a locking plate 41 connected to an additional piston member 42 which can move slidingly within the plunger 11. A coil spring 43, acting between the piston member and flange 14, as shown, urges the locking plate against a complementary surface 31 of support block 30 and holds the gimbal arrangement in the locked condition. A groove 44 and a complementary projection 32, formed respectively in plate 41 and on surface 31, maintain the plate and support block in centralised, interlocked relationship.

The piston member 42 defines a closed, substantially air-tight cavity 45 within plunger 11. This cavity is coupled, via a bore 46, to a source (not shown) of compressed air which can be actuated whenever displacement on axis ZZ exceeds the preset amount. In these circumstances, the air pressure inside the cavity is caused to rise forcing the piston member back against the action of spring 43 and so lifting the locking plate away from the support block 30, thereby releasing the gimbal arrangement. A sensor shown generally at 50 in FIG. 3b, is arranged to monitor displacement of the gripper on axis ZZ and to generate a control signal for actuating the air source whenever the displacement exceeds the preset amount. In this example, the sensor comprises a LED light source and an associated photo sensitive detector which are both mounted on the outer frame member. If the gripper is displaced with respect to the arm, the sensor will approach a probe 51 mounted on housing 12, as shown. The probe can be so positioned in relation to the sensor as to interrupt the light beam produced by the LED when the gripper has been displaced by a sufficient amount, and so initiate a control signal.

It will be appreciated that in operation of the coupling mechanism the gimbal arrangement 20 will initially assume the locked condition, as shown in the drawing. If the gripper then experiences a force directed along axis ZZ, as may be encountered for example, on insertion of a pin in a hole, the coupling mechanism will, at least initially, exhibit compliance in the ZZ axis direction only. If, however, the force persists and displacement on axis ZZ exceeds a preset amount, defined by the relative position of the probe and sensor, the gimbal arrangement is caused to assume the unlocked condition to render the coupling mechanism compliant in relation to the XX and YY axis directions also. The gripper is then free to move in response to the forces to which it may be subjected.

In the locked condition the gimbal arrangement presents a generally rigid structure and so tends to be relatively insensitive to vibration.

We claim:

1. A compliant mechanism for coupling a robot gripper to a robot arm, said mechanism comprising:
   means for supporting the gripper;
   first compliant means to permit displacement of said support means relative to said arm along a first axis;
   second compliant means to permit further displacement of said support means relative to said arm in at least one of a linear direction along and a rotational direction about at least one other axis;
   locking means associated with said second compliant means to inhibit said further displacement;
   means for monitoring said relative displacement along said first axis and for generating a signal whenever said displacement exceeds a pre-set amount; and
   means for releasing said locking means in response to said signal to permit said further displacement.

2. A mechanism according to claim 1 wherein said locking means includes a locking member and resilient biassing means for holding the locking member in locking relationship to said suppport means to prevent said further displacement.

3. A mechanism according to claim 2 wherein said releasing means comprises means for opposing the action of said resilient biassing means in response to said signal, thereby to urge said locking member apart from said support means.

4. A mechanism according to claim 1 wherein said second compliant means comprises a gimbal arrangement including first displacement means connected to said support means to permit said further displacement in a linear direction along and a rotational direction about a second axis, and second displacement means connected to said first displacement means and said first compliant means to permit said further displacement in a linear direction along and a rotational direction about a third axis, said second and third axes being mutally orthogonal.

5. A robot comprising an arm, a gripper, and a compliant mechanism for coupling said gripper to said arm, said mechanism comprising means for supporting the gripper, first compliant means to permit displacement of said support means relative to said arm along a first axis, second compliant means to permit further displacement of said support means relative to said arm in at least one of a linear direction along and a rotational direction about at least one other axis, locking means associated with said second compliant means to inhibit said further displacement, means for monitoring said relative displacement along said first axis and for generating a signal whenever said displacement exceeds a pre-set amount, and means for releasing said locking means in response to said signal to permit said further displacement.

* * * * *